March 5, 1963

A. O. McCOUBREY ET AL 3,080,519

NUCLEAR MASER

Filed July 20, 1959

3 Sheets-Sheet 1

ARTHUR O. McCOUBREY
ALEXANDER GANSSEN
*INVENTORS*

*BY* KENWAY JENNEY WITTER & HILDRETH
*ATTORNEYS*

ARTHUR O. McCOUBREY
ALEXANDER GANSSEN
INVENTORS
BY KENWAY JENNEY WITTER & HILDRETH
ATTORNEYS

ARTHUR O. McCOUBREY
ALEXANDER GANSSEN
*INVENTORS*

*BY* KENWAY JENNEY WITTER & HILDRETH
*ATTORNEYS*

3,080,519
NUCLEAR MASER

Arthur O. McCoubrey, Topsfield, and Alexander Ganssen, Wakefield, Mass., assignors to National Company, Inc., Malden, Mass., a corporation of Massachusetts Filed July 20, 1959, Ser. No. 828,374
12 Claims. (Cl. 324—.5)

Figure 1:
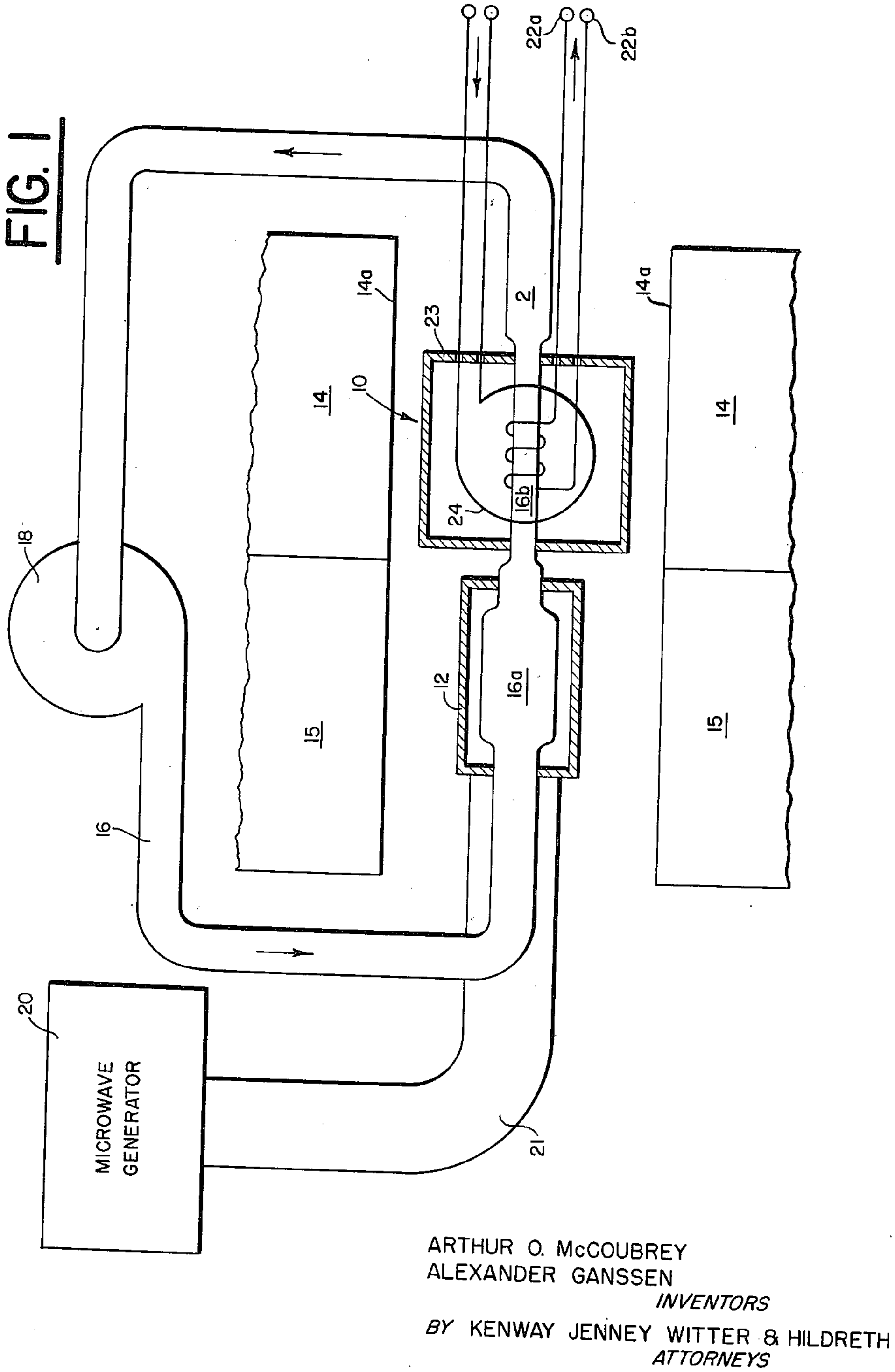

This invention relates to a maser adapted for efficient operation at frequencies in the region below 50 megacycles. The maser uses the energy level transitions of atomic nuclei, stimulated by an input signal to amplify or filter the input signal. It is also capable of operation as a highly stable oscillator in this region.

The term "maser" is a word coined from "microwave amplification by stimulated emission of radiation." However, the term has been extended to devices other than amplifiers and to operating frequencies other than those in the microwave region. Thus, the distinguishing characteristic of maser devices at this time is the utilization of radiation produced by stimulated emission.

Maser amplification is characterized by an extremely low noise figure, and therefore amplifiers of this type are of great value in low signal level applications. Furthermore, the frequency of operation can be made to depend on essentially invariant properties of atomic and subatomic particles such as electron spin and nuclear magnetic moment. Masers may therefore be constructed with very narrow bandwidths, thereby increasing their suitability for operation at low signal levels. Thus, they may operate not only as amplifiers, but also as extremely narrow bandwidth filters. They may also be used as oscillators with a high degree of stability.

The principles of operation of masers are well known, having been explained, for example, by Gordon et al., Physical Review, vol. 99, No. 4, p. 1264, Bloembergen, Physical Review, vol. 104, p. 324 (1956), and Basov et al., Journal of Experimental and Theoretical Physics (U.S.S.R.), vol. 28, p. 249 (1955). However, the operation and advantages of our invention will be better appreciated after considering a short explanation of maser operation.

Maser operation depends on the fact that atomic and subatomic particles exist at various discrete energy levels. A particle may jump from a lower energy level or state to a higher one by the absorption of energy in the form of electromagnetic radiation. It may descend again to the lower state by releasing equivalent energy in the same form. The frequency, $f$, of the radiation adsorbed or emitted by the particle in changing energy states is related to the difference in energy between the upper and lower states, as given by, $$f=\frac{W_2-W_1}{h} \qquad (1)$$

where,
$W_2$ is the energy of the upper state,
$W_1$ is the energy of the lower state, and
$h$ is Planck's constant.

One way in which an atom may be made to drop from an excited or upper energy state to a lower state is by the stimulation of radiation having the frequency $f$. Accordingly, if a quantum of such energy strikes the atom, the original quantum plus an additional one created by emission from the atom will result. The total radiation at the frequency $f$ is thus increased, and in this manner the maser operates as an amplifier.

In order for a maser to amplify, the total number of particles per unit volume, herein termed the "population," $n_2$ in the upper energy state must be greater than the number $n_1$ in the lower state. Otherwise, for each quantum of radiation emitted by stimulated emission, there will be one or more quanta absorbed by particles in the lower state and raised to the upper state thereby. Normally, however, under equilibrium conditions $n_2$ is less than $n_1$, as given by the Boltzmann factor, $$\frac{n_2}{n_1}=e^{-\frac{hf}{kT}} \qquad (2)$$

where,
$k$ is Boltzmann's constant, and
T is the absolute temperature in degrees Kelvin.

In gaseous masers an excess number of particles in the upper energy state is obtained by separating out the molecules in the lower state. Solid state masers generally utilize three energy states with one pair of these levels used in absorbing energy from a local oscillator and another pair utilized in emitting energy in response to stimulation by the input signal.

Prior to the present invention, gaseous masers have been made to operate only in the microwave region. Solid state masers, which depend on the magnetic properties of the spinning electron, may be operable below this region, but for practical reasons their operation is restricted to high frequencies, more specifically to the region above 50 megacycles. In particular, the bandwidth obtainable at low frequencies is greater than may be desirable in some applications. Even where the bandwidth requirement is not too severe, the slope or skirt selectivity of the frequency characteristic is often unsuitable.

The magnetic properties of certain atomic nuclei may also be made the subject of maser operation. If a magnetic field $H_0$ is applied to particles having a magnetic moment $\mu$ and angular or spin momentum $$p=\frac{Ih}{2\pi}$$

where I is the spin quantum number, there will be (2I+1) energy levels spaced in energy by $$\frac{\mu H_0}{I}$$

For electrons as well as protons $$I=\frac{1}{2}$$

and therefore there are two levels. From Expression 1 it will be seen that the resonance frequency corresponding to the transition between these two possible levels may be expressed by, $$f=\frac{\mu H_0}{Ih} \qquad (1a)$$

Thus, spinning electrons with a relatively large magnetic moment have a high transition frequency for a given applied magnetic field $H_0$. In fields of conventional strength the resonance frequency is of the order of kilomegacycles.

Nuclear magnetic resonance frequencies, on the other hand, are considerably lower. More specifically, the magnetic moment of the hydrogen nucleus or proton is 1/660 of the magnetic moment of the electron. Accordingly, the transition or resonance frequency is 1/660 as great as the electron frequency for the same strength of applied field. For example, the proton resonance may be tuned over the 2–30 megacycle range with a magnetic field variation of 470–7000 oersteds. These field strengths are easily realizable with present day equipment. Moreover, proton resonance in this range may be obtained with very high Q or narrow bandwidth.

By combining Expressions 2 and 1*a*, the Boltzmann distribution may be restated as $$\frac{n_2}{n_1}=e^{-\frac{\mu H_0}{IkT}} \quad (2a)$$

The excess number of particles in the lower state $(n_1-n_2)$ at thermal equilibrium is then given approximately by $$n_1-n_2=\frac{n}{2}\frac{\mu H_0}{IkT} \quad (3)$$

where, $$n=n_1+n_2$$

and $$\frac{\mu H_0}{I}$$

is much less than kT, as is normally the case.

The power available from a maser depends on the excess number in the upper energy state $(n_2-n_1)$, that is, the net concentration of particles capable of stimulated emission. In a maser utilizing nuclear resonance, where only two energy levels may be employed, one method of obtaining an upper state excess is to apply any of several techniques of state inversion. For example, an "adiabatic rapid passage," as described by Bloch, Physical Review, vol. 70, p. 460 (1946), will provide an upper state excess number $(n_2-n_1)$ equal to the thermal equilibrium lower state excess number $(n_1-n_2)$. However, because of the small nuclear magnetic moment, $\mu_p$, the lower state excess number is relatively small and consequently the upper state excess number following state inversion provides relatively little radio frequency energy (of the order of $10^{-10}$ watts per cubic cm. in the case of protons).

Another method of obtaining an upper state excess nuclear population makes use of the so-called "Overhauser effect" in fluids. In the case of a dipole-dipole type coupling between two spin systems, for example, magnetic interaction between spinning electrons and protons in a fluid, any change in the excess number of one of the systems (electron) will result in a change in the excess number of the other (proton) spin system. Thus, strong "saturating" radiation at the resonant frequency of one of the systems may be used to boost particles from the lower to the upper energy state thereof until the numbers of particles in the two states are equal, and the excess number is zero. Because of the Overhauser interaction, the upper state excess $(n_2-n_1)$ of the other system will, in certain cases, undergo an algebraic increase. This is true, for example, of electrons and protons in certain fluid materials.

Furthermore, where a spin system with a large equilibrium excess number $(n_1-n_2)$ (e.g., electrons) is coupled with a system of small excess number (e.g., hydrogen nuclei), a considerable increase in the upper state excess of the latter may be obtained upon saturation of the resonance of the former system in the above manner. This increase is of the same order of magnitude as the equilibrium excess number of the first (electron) system. Thus, in a liquid such as water, containing hydrogen nuclei with an electron spin system supplied by free radicals or paramagnetic ions, saturating radiation at the electron transition frequency will result in a nuclear upper state excess number far greater than that obtainable simply by state inversion of the nuclear system. The power obtainable from the nuclear spin system is correspondingly increased. Illustratively, a nuclear power output of $4\times10^{-10}$ watts per cubic cm. in a field $H_0$ of 5000 gauss may be increased by about 300 times in this manner to more than $10^{-7}$ watts.

Accordingly, the principal object of our invention is to provide an improved maser utilizing stimulation of nuclear magnetic transitions, for example, the transition between the magnetic energy states of the hydrogen nucleus or proton. A more specific object of the invention is to provide a practical maser of the above character utilizing the Overhauser effect to obtain a workable excess number of nuclei in the upper energy state.

Another object of our invention is to provide a maser of the above character adapted for efficient operation at comparatively low frequencies, e.g., in the region of 2–30 megacycles and below. Another object of the invention is to provide a maser of the above character capable of operation with low internal noise generation and therefore useful at low signal levels. It is a further object of the invention to provide a maser of the above character capable of operation as an amplifier or oscillator. Yet another object of the invention is to provide a maser of the above character capable of narrow band operation and therefore adapted for use as a high Q filter. Another object of the invention is to provide a master of the above character capable of frequency response curves having various arbitrary shapes. Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figures 2, 3, 4:
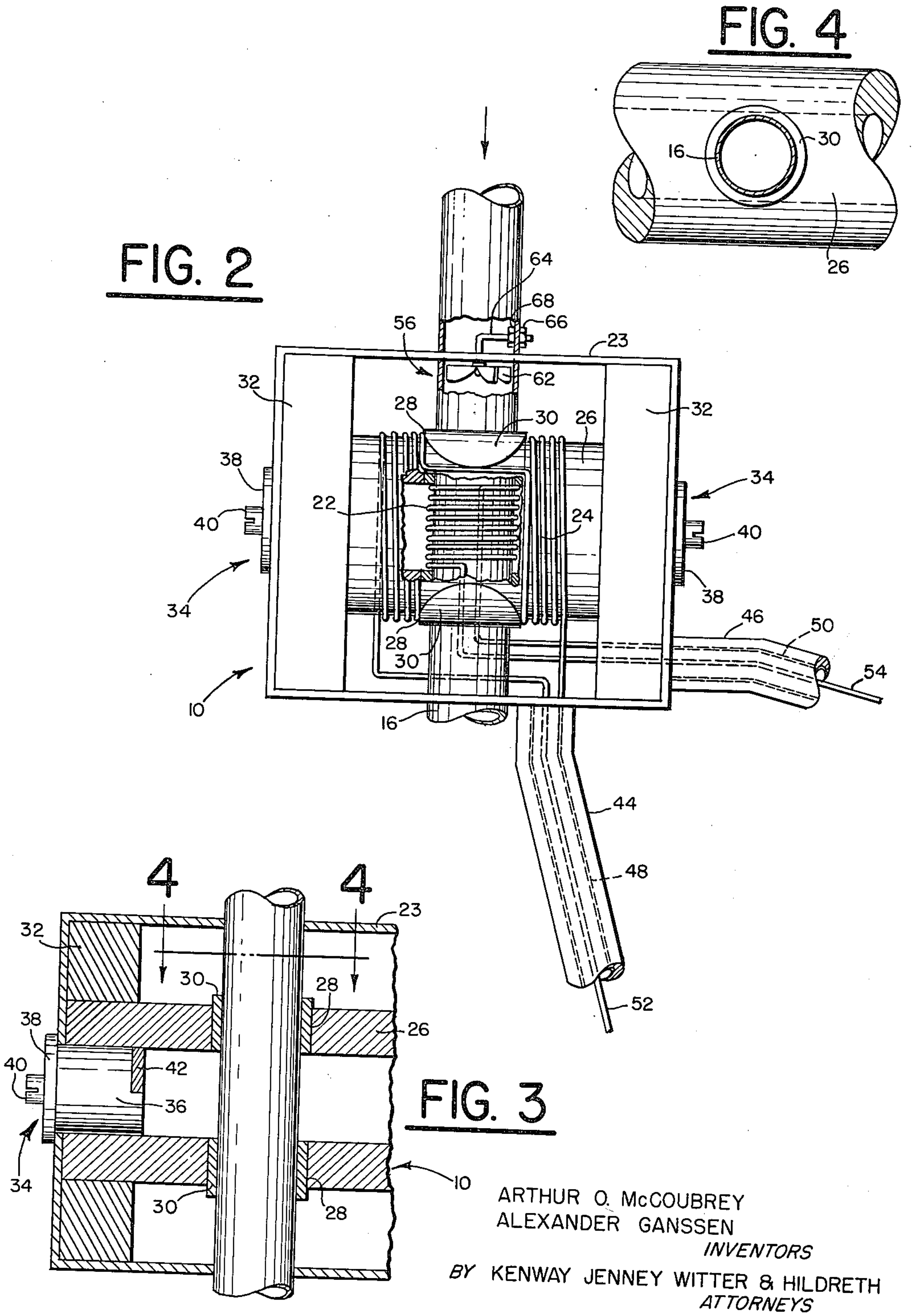
Figure 5:
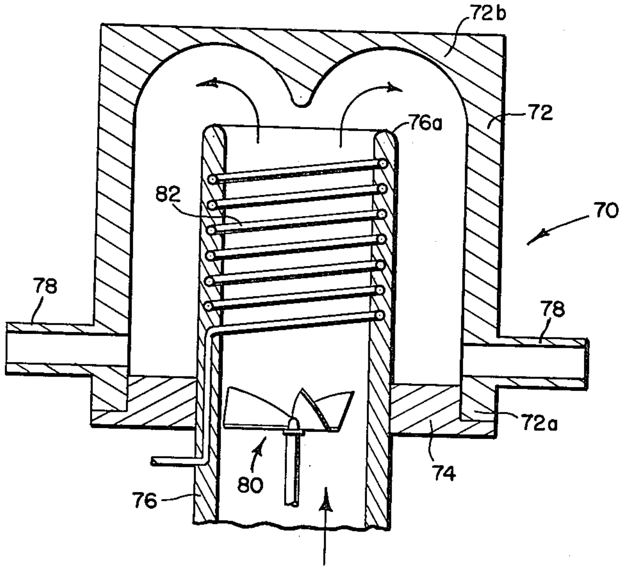
Figure 6:
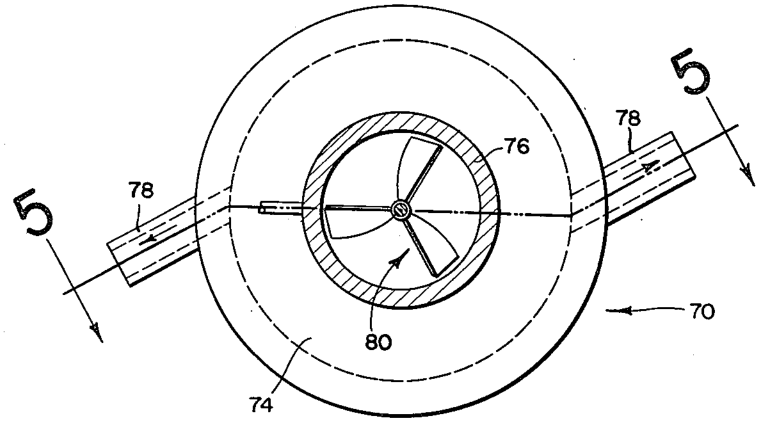

For a fuller understanding of the nature and objects of the invention, reference should be had to the following detailed description taken in connection with the accompanying drawings, in which:

FIGURE 1 is a schematic representation of a maser incorporating the principles of our invention, FIGURE 2 is a view, partly in section, of the emission unit used in the maser of FIGURE 1, with the cover removed from the emission unit, FIGURE 3 is a fragmentary simplified view, similar to FIGURE 2, showing the interior of the emission unit of FIGURE 1, FIGURE 4 is a view taken along line 4—4 of FIGURE 3, FIGURE 5 is a view, partly in section, of the interior of another emission unit which may be used in the maser of FIGURE 1, and FIGURE 6 is a bottom plan view, partly in section, taken along line 6—6 of FIGURE 5.

Our invention combines the Overhauser effect with the flow of a fluid, preferably a liquid maser material, which is circulated through various parts of the apparatus. The liquid is first passed through a boosting region where the resonance of an electron spin system is saturated by radiation from a local generator to provide a nuclear upper state excess number. Next, it travels through a resonance or emission region where it is subjected to an input signal which stimulates emission of an output signal from the upper state nuclei.

Physical separation of the boosting and emission functions permits the use of different applied magnetic fields on the electrons subjected to radiation from the local generator and the nuclei emitting radiation as a result of stimulation by the input signal. The nuclear resonance frequency may then be varied by changing the field in the emission region while leaving the electron resonance frequency unchanged. Also, it may be desirable to give some arbitrary shape to the frequency response curve of the maser. This can be accomplished by spatially varying the magnetic field in the emission region to make given portions of the emission volume resonate at different frequencies. On the other hand, optimum efficiency of the nuclear boosting operation dictates a normal response curve for the electron resonance, achieved by a fairly homogeneous magnetic field in the boosting region.

Moreover, the radiation from the local generator heats the liquid maser material and thereby raises its temperature. This adversely affects operation of the maser. Circulation of the liquid through the system permits use of efficient heat dissipation methods.

The electron resonance is in the microwave range, and therefore the boosting region is in a resonant cavity tuned to the electron resonance frequency. The lower frequency of the nuclear magnetic resonance, however, requires the use of coils for the transfer of energy. The presence of these coils in the boosting region would distort the microwave field and prevent some portions of this region from receiving sufficient saturating energy. Our invention, which incorporates separated boosting and resonance regions, overcomes this problem.

Preferably, the two regions are located in separate enclosures with the circulating liquid maser material pumped through a conduit from the boosting region to the emission region. However, our invention also contemplates the use of a single enclosure housing both regions.

The resonating nuclei may be contained in a low viscosity liquid, e.g., hydrogen nuclei in water or other liquids having desirable nuclear and electronic properties, in which they are relatively free to orient their spin precession axes according to the direction of an applied magnetic field. The "free" electrons required for the Overhauser effect which brings about the nuclear upper state excess may be incorporated in "free radicals," paramagnetic ions, or broken chemical bonds (such as an activated carbon black) dissolved or suspended in the liquid.

Generally speaking, the processes involved are dependent only on those electrons whose spins are uncompensated by opposing electron spins so that they are able to interact with certain nuclei in the above manner, and therefore "electron" and "electron concentration," as used herein, are restricted to such electrons. The term "free electron spin" has the same meaning.

Nuclei with magnetic moments are, as pointed out above, subject to influence by the free electrons. More specifically, electrons in the upper state colliding with protons in the lower state may bring about changes in the population of the nuclear magnetic energy states. In the case of hydrogen nuclei in the presence of electrons, the relationship between the nuclear and electron polarizations (lower state excess number) is given by, $$I_z = I_0 - \rho c(S_z - S_0) \qquad (4)$$

where, $I_z$ and $S_z$ are the relative nuclear and electron polarizations, $$\frac{n_1 - n_2}{n}$$

respectively, $I_0$ and $S_0$ are the corresponding nuclear and electron equilibrium polarizations governed by Expression 3 in the absence of externally applied radiation, $c$ is an efficiency factor whose value can be approximately 1, and $\rho$ is an electron-nucleus coupling factor whose value is ½ in the case of dipolar coupling.

If the electron resonance is saturated by applying sufficient electromagnetic energy at a frequency corresponding to the electron resonance frequency, the radiation imposes a new steady state at which the relative electron polarization $S_z$ is approximately zero. The relative nuclear polarization then becomes, $$I_z = I_0 + \tfrac{1}{2} S_0 \qquad (5)$$

and since $I_0$ is much less than $S_0$, $$I_z \approx \tfrac{1}{2} S_0 \qquad (6)$$

The nuclear polarization is now half the original electron polarization; since the magnetic dipole momentum of the electrons is negative, $n_2$ will be greater than $n_1$ for the nuclei, and there will be an excess number in the upper state. This excess provides a more efficient maser operation than would be the case without utilization of the Overhauser effect.

The liquid maser material passes first through a microwave resonant cavity tuned to the electron resonant frequency and then through a nuclear magnetic resonance head. In the cavity the liquid is subjected to a saturating radiation to reduce the electron polarization and thereby obtain a substantial net negative nuclear polarization, i.e., a substantial excess number of nuclei in the upper energy state. The nuclear resonance head is provided with an input coil to which the input signal may be applied. This coil is aligned with its axis perpendicular to that of the applied static magnetic field, and thereby provides for stimulation of emission by the nuclei in response to the alternating magnetic fields set up parallel to the coil axis by the input signal. Where the maser is used as an amplifier, an output coil is provided with its axis perpendicular both to the axis of the input coil and the applied field. This minimizes coupling between the coils while optimizing coupling between the output coil and the energy-emitting nuclei responding to stimulation by the input signal. An amplifier constructed in this manner, operating in the 10 megacycle frequency range, with a circuit Q of 100, may have an RF output power on the order of $6.6 \times 10^{-7}$ watts for a gain of 3, with internal noise generation of $2 \times 10^{-18}$ watts. By using appropriate techniques for maintaining the static field $H_0$ constant within the volume where stimulated emission takes place and averaging inhomogeneities in this field, an effective Q of over $10^6$ may be achieved.

For use in an oscillator, one of the coils may be eliminated. The single remaining coil may be connected in the feedback circuit of the oscillator. The effective impedance of the coil will vary sharply in the neighborhood of the nuclear resonance, thereby controlling the oscillator frequency with a high degree of precision.

In FIGURE 1 we have illustrated a maser amplifier incorporating the principles of our invention. As shown therein, the maser includes a nuclear resonance head generally indicated at 10, a resonant cavity 12 adjacent to the resonance head 10, and magnets schematically indicated at 14 and 15 which provide magnetic fields $H_0$ extending through the resonance head 10 and cavity 12. The apparatus also includes a pipe 16 extending through the cavity and resonance head and a pump 18 which circulates a suitable liquid maser material through the pipe in the direction of the arrows.

A microwave generator 20, which has an output at the resonance frequency of the electrons utilized in obtaining the desired nuclear polarization, is connected by a wave guide 21 to the resonant cavity 12, and the latter is tuned to this frequency. An output coil 22 is formed about the pipe 16 within a housing 23 of the resonance head 10, with the axis of the coil thereby oriented perpendicular to the field $H_0$ between the poles 14a of the magnet 14. An input coil 24 within the housing 23 is oriented at right angles to both the coil 22 and the field $H_0$.

The cavity 12 may be cylindrical and excited in the $TE_{112}$ mode with the magnetic field of the microwave energy perpendicular to the static field $H_0$. Accordingly, as liquid from the pump 18 passes through the resonant cavity, the electron resonance is saturated, and the population of the upper and lower electron energy states is equalized. Within a short time, the active nuclei in the liquid attain a net polarization in alignment with the static field $H_0$, i.e., the number of such nuclei in the upper nuclear energy state exceeds the number in the lower state because of the Overhauser effect previously discussed. The liquid then enters the resonance head 10 where energy emission by the nuclei is stimulated by an input signal applied to the coil 24. This energy, in the form of an alternating magnetic field, is picked up by the coil 22 whose terminals 22a and 22b are the output terminals of the maser.

The resonance head 10 is shown in detail in FIGURES 2, 3 and 4. As shown therein, the housing 23, which is preferably of copper to effectively shield the enclosed elements, contains a coil form 26 about which the input coil 24 is wound. The coil 24 is split in two with one half on each side of the pipe 16 which passes through apertures 28 in the coil form 26. The apertures are large enough to permit the form 26 to pass over the output coil 22, which is wound directly on the pipe 16. A pair of bushings 30 securely position the pipe 16 in the apertures 28. The coil form 26 is positioned in the housing 23 by a pair of blocks 32 which engage both the housing and the coil form.

A pair of field adjusters generally indicated at 34 extend through the housing 23 into the interior of the coil form 26. As seen in FIGURE 3, the adjusters 34 include cylindrical slugs 36 rotatable within the coil form, bearing plates 38 and slotted shafts 40 affixed to the bearing plates. The slugs 36, which are themselves of insulating material, are provided with small conducting segments 42 of copper or the like on their inner surfaces. Rotation of the slugs 36 by the shafts 40 will cause angular displacement of the segments 42. This will in turn change the distribution of the radio frequency field within the housing 23. The segments on the two adjusters 34 may be rotated to provide a field distribution which virtually eliminates coupling between the input and output coils 24 and 22, the coupling between these coils being reduced in the first place by their mutually perpendicular orientation.

The coils 24 and 22 are connected to input and output circuits by coaxial cables 44 and 46, respectively, provided with shields 48 and 50 and central conductors 52 and 54.

The pipe 16 should be transparent to the microwave radiation in the cavity 12 and the amplified energy in the resonance unit 10. Also, it should not react with corrosive liquids which may be passed through it. Accordingly, the pipe is preferably of quartz or a suitable relatively inert plastic material having low loss characteristics at the frequencies within the cavity and resonance head. Likewise, the surfaces of the pump 18 in contact with the liquid should be of plastic material which is inert in the presence of the liquid maser material.

The bandwidth of the apparatus generally depends on the homogeneity of the static applied field $H_0$ in the emission region. Since the nuclear resonant frequency is a function of $H_0$, any variation of the latter within the volume in which the stimulated emission takes place will result in a varied resonant frequency. This corresponds to increased bandwidth and lower effective Q. Variations of $H_0$ with respect to time may be minimized by well-known magnetic field control techniques if the source of this field is an electromagnet; or the magnet 14 may be a temperature stabilized permanent magnet, which would virtually eliminate time variations. Spatial variations of $H_0$ within the resonance unit 10 may be minimized by careful shaping of the poles 14a and by the use of shims (not shown) of compensating magnetic material. There is a practical limit, however, to the homogeneity which can be achieved in this manner. Therefore, we have provided a field averaging arrangement which increases still further the effective Q of the apparatus.

It can be shown that a particle exposed to an effective range of field variation $(\Delta H_0)_{eff}$ can be made to react as if it were exposed only to the average value of the field if it encounters the entire range of variation in a time, *t*, on the order of $$t \leq \frac{2\pi}{\gamma(\Delta H_0)_{eff}} \qquad (7)$$

where, $$\gamma = \frac{\mu}{p} = \frac{2\pi\mu}{Jh}$$

$$(\Delta H_0)_{eff} = \gamma < (\Delta H_0)^2 >_{av} \cdot t$$

where, $<(\Delta H_0)^2>_{av}$ is the mean square deviation of the field in the emission region from the average value of the field therein.

Thus, for a field variation of approximately 0.002 oersteds, the particles should encounter the entire range of $\Delta H_0$ in a time *t* of less than 0.1 second for this averaging to take place.

Referring to FIGURE 2, we have provided a baffle, generally indicated at 56, disposed in the pipe 16 immediately upstream of the emission region in the resonance head 10. The baffle 56 includes blades 58, 60 and 62, affixed to an angled bar 64 passing through the wall of the tube 16 and fastened thereto by a nut 66 working against a flange 68. Each of the radially extending blades 58, 60 and 62 is canted at an angle to the direction of flow of the fluid in the pipe 16. Accordingly, as the fluid passes the baffle 56, the latter imparts a spiral motion to it, and this motion continues as the fluid passes through the resonance head 10. Assuming a diameter of 1 cm. for the pipe 16 and a liquid velocity of 10 cm. per second, a spiral flow can easily be applied by the baffle 56 to rotate each molecule at least once in the emission region with an average period of .1 second. This is sufficient to provide effective field averaging with a substantial increase in the effective Q of the maser.

On the other hand, if an arbitrary frequency response curve other than the normal curve is desired, the poles 14a may be shaped to vary the field $H_0$ in the emission region and thereby provide the desired band of nuclear resonance frequencies. The proportion of the emission region having a particular resonant frequency determines in large part the power output at that frequency, and therefore the shape of the response curve is determined by the proportions of the emission region having resonant frequencies at various points. These proportions can be regulated by providing the poles 14a with proportionate areas having magnetic fields corresponding to the various frequencies. Also, the diameter of the pipe 16 may be varied to provide different volumes of maser material opposite various portions of the poles 14a. Since the normal nuclear response curve can be made very sharp, an arbitrary response curve formed in the above manner can be provided with sharp skirt selectivity. The baffle 56 will ordinarily not be used when response curves of this nature are desired.

As pointed out above, the power output and efficiency of the maser depend on the net number of nuclei available for stimulated emission. This number is equal to the product of the nuclear upper state excess number $(n_2-n_1)$ and the volume flow rate through the emission volume. The relationship between the nuclear excess number or polarization and the equilibrium electron polarization is given by Expression 5. The equilibrium electron polarization is given by substitution of the electron constants in Expression 3:

$$(n_1-n_2) = \frac{n_e}{2}\frac{\mu_e H_0}{SkT} \qquad (8)$$

where S is the electron spin quantum number, being ½.

By combination with (3) and (5), the enlargement factor of nuclear polarization may be obtained:

$$\frac{I_z}{I_0} = \frac{1}{2}\frac{\mu_e}{\mu_0} \approx 330 \qquad (9)$$

In the case of water ($n_0=6.7\times10^{22}$ nuclei per cubic cm.) at a temperature of 300° K. and in a field of 2000 oersteds, the nuclear polarization at thermal equilibrium, $I_0$, is on the order of $3\times10^{16}$ per cubic cm. With the Overhauser effect, an excess of nearly $10^{19}$ nuclei per cubic cm. in the upper state can be achieved.

Because of interactions with the magnetic fields of other particles, such as electrons, the nuclei relax or drop to the lower state, and this process results in a return of the nuclear spin system to the thermal equilibrium condition of Expression 2. The relaxation of the system is related to the passage of time by an exponential decay and the relaxation time may be defined as the time required for $$\frac{1}{e}$$

of the nuclei to relax, where $e$ is the base of the natural logarithm. If the electron concentration is large, electron-nuclear interactions will be more frequent and the relaxation time will be reduced accordingly. Relaxation due to interactions with electrons begins when the nuclei leave the electron-saturating field in the cavity 12. The relaxation time should be greater than the transit time required for the liquid to pass from the cavity 12 through the emission unit 10. Preferably, it is considerably longer than the transit time so as to minimize the number of nuclei which relax prior to stimulation in the resonance head 10. Therefore, the resonance head 10 and cavity 12 are located as close to each other as practicable, and the velocity of the protons through the head 10 is maintained at a high rate.

On the other hand, the time required for the operation of the Overhauser effect on the nuclei is generally on the order of the nuclear relaxation time, and the nuclei should remain in the saturating microwave field in the cavity 12 for at least this length of time. More specifically, within the saturating field there shoud be on the average at least one collision between each nucleus (proton) and a free electron. This will be the case if the average time nuclei and free electrons spend in the saturating field is at least the nuclear relaxation time. For water, a relaxation time of one second may be assumed for a free electron (paramagnetic ion) concentration on the order of $10^{17}$ per cubic centimeter. A lower concentration is not desirable because the relaxation time of the protons in pure water, caused by the presence of oxygen atoms, is of the same order of magnitude. Thus, with a low electron concentration, the portons will be returned to the lower energy state at practically the same rate that they are elevated to the upper state by collisions with the electrons, and there will be insufficient upper state polarization of the proton spin system. Preferably, the free electron concentration is greater than $10^{17}$ per cubic centimeter but not so great as to reduce unduly the nuclear relaxation time.

In order to insure the presence of the particles in the saturating field for a sufficient time, the liquid velocity in the cavity 12 is preferably made less than that in the resonance head. As seen in FIGURE 1, the pipe 16 has an enlarged portion 16*a* in the cavity 12 and a narrowed portion 16*b* through the resonance head 10. The velocity in the portion 16*b* is greater than in the other portions of the pipe, and the velocity in the portion 16*a* is less than in the other portions. The realtive diameters of the enlarged and narrow portions, combined with the pumping rate of the pump 18, may thus provide the desired velocities in the resonance head 10 and resonant cavity 12.

In FIGURES 5 and 6, we have illustrated another resonance head construction utilizing a reflex arrangement in which the liquid maser material envelops the input coil. Practically the entire magnetic flux path of the coil is in the liquid, making the filling factor of the resonance coil practically unity.

As seen in FIGURES 5 and 6, a resonance head generally indicated at 70 has an outer casing 72 in the form of a cylindrical cup. The lower end 72*a* of the casing is sealed by a plate 74 with a tube 76 passing through the plate 74 into the interior of the resonance head 70. The liquid maser material enters the unit 70 upwardly (FIGURE 5) through the tube 76 and then flows from the upper end 76*a* of the tube downwardly through the annular space between the tube 76 and casing 72. It leaves the head 70 by way of exit tubes 78 extending through the casing 72 adjacent the plate 74. The interior of the upper end 72*b* of the casing 72 has a semitoroidal shape to facilitate reversal of the liquid flow with minimum turbulence. A baffle, indicated at 80, disposed in the tube 76 adjacent the plate 74 imparts a spiral motion to the liquid entering the unit 70 in the manner described above.

As seen in FIGURE 5, a coil 82 is embedded in the tube 76 within the casing 72. The resonance head 70 is operated in a static magnetic field with the axis of the coil 82 perpendicular to the field as in the embodiment previously described. The head 70 has only the one coil 82, although it will be apparent that a second coil may be provided.

In an oscillator, the coil 82 might be connected in the feedback circuit. At the nuclear resonant frequency the voltage across the coil would be augmented by the voltage induced in the coil by stimulated nuclear emission. The nuclear transition induced voltage is sufficient to maintain oscillation at the nuclear resonant frequency. At other frequencies there will be no stimulated emission, and consequently the feedback voltage will be insufficient to maintain oscillation.

To increase the flexibility of the system, the nuclear resonance in the resonance heads 10 and 70 may be tuned by using a magnet 14 (FIGURE 1) with a variable field. For example, it might be an electromagnet whose current is varied to change the field strength in the resonance head and thereby alter the nuclear resonance frequency therein. The frequencies passed by amplifiers and filters, as well as the frequencies of oscillators incorporating our invention, may thus be varied at will.

Thus, we have described a maser adapted for efficient operation at frequencies under 50 megacycles, in fact, down into the audio range. The maser includes as maser material a fluid, for example, a low viscosity liquid such as water having nuclei which resonate in easily provided magnetic fields. Upper state polarization of the nuclei is accomplished by means of the Overhauser effect in which the coupling between free electrons and nuclei may be utilized to make the nuclear polarization dependent on the electron polarization. This permits an increase in nuclear polarization to the same order of magnitude as that of the electrons, and thereby provides an improvement in gain (in amplifier applications) and output power.

It will this be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A maser comprising, in combination, liquid maser material including an abundance of uncompensated nuclear and electron spins, means for containing said material, means for passing a static magnetic field through a first region in said containing means, means for passing a static magnetic field through a second region in said containing means, means for illuminating said first region with electromagnetic energy at the electron magnetic resonance frequency determined by the static magnetic field in said first region and thereby reducing the number of electrons in the lower of the states defining the electron magnetic resonance in said magnetic field in said first region, means for moving said liquid from said first region to said second region and means for stimulating nuclear magnetic resonance emission in said second region, said second region being substantially free from said illuminating energy in said first region.

2. The combination defined in claim 1 in which said liquid moving means is adapted to move said liquid from said first region to said second region in a time less than the nuclear magnetic resonance relaxation time.

3. The combination defined in claim 2 in which said liquid moving means is adapted to move said liquid through said first region in a time substantially as long as the nuclear magnetic resonance relaxation time.

4. The combination defined in claim 1 in which said means for passing a magnetic field through said second region includes means for varying the magnetic field thereof, thereby to facilitate tuning of said maser.

5. The combination defined in claim 1 in which the density of uncompensated electron spins is at least $10^{17}$ per cubic centimeter.

6. A maser adapted to utilize transitions between energy states of nuclear particles, said maser comprising, in combination, liquid maser material including an abundance of uncompensated electrons and nuclei, a conduit containing said material, a resonant cavity disposed about said conduit, a magnet adapted to pass a static magnetic field through said cavity, means for exciting said cavity with electromagnetic radiation whose frequency corresponds to the difference in magnetic energy levels of said electrons in said static magnetic field through said cavity, with the magnetic field of said radiation perpendicular to said static field in said cavity, a metallic enclosure formed about said conduit adjacent to said cavity, a first coil formed about said conduit within said enclosure, a second coil within said enclosure, the axis of said second coil being perpendicular to the axis of said first coil and the static field within said enclosure, whereby said coils are magnetically coupled to said maser material in said conduit, and a magnet arranged to pass a static magnetic field perpendicular to said conduit and through said conduit in the portion thereof bounded by said coils, whereby said maser material is conditioned in said cavity for amplification by stimulated emission at a frequency corresponding to the magnetic resonance of said nuclei and such amplification may be obtained by applying a signal to be amplified to one of said coils and extracting said signal from the other coil.

7. The combination defined in claim 6 including a pump adapted to pass said material in said conduit through said cavity and then through said enclosure.

8. The combination defined in claim 6 in which said conduit includes an expanded portion in said cavity and a narrowed portion in said enclosure.

9. A resonance head adapted for use in a maser utilizing liquid maser material, said resonance head comprising, in combination, a tubular housing closed at one end, a conduit coaxial with said housing and extending thereinto from the other end thereof, a coil formed on said conduit, means for imparting a spiral motion to liquid material passing through said coil, and means for pumping said material through a path extending through said conduit and the space between said conduit and said housing in a time less than the relaxation time associated with the maser operation in which said material is utilized, said material being exposed to the field of said coil both within said conduit and in the region within said housing surrounding said coil.

10. A resonance unit adapted for use in a maser utilizing liquid maser material, said unit comprising, in combination, a metallic housing, a non-conducting conduit extending through said housing, a first coil around said conduit, a second coil perpendicular to said first coil, the axis of said second coil passing through said first coil, a magnet arranged to pass a magnetic field through said unit perpendicular to the axes of said first and second coils and through the portion of said conduit bounded by said coils, and means for causing said liquid material to undergo spiral motion as it passes through said conduit within said first coil, said spiral movement means being arranged to impart a rotational velocity to said material sufficient to enable the molecules thereof to encounter substantially the entire variation of the field of said magnet within said first coil.

11. A resonance unit for use in a maser utilizing liquid maser material, said unit comprising, in combination, a housing having a first and second end, said housing being closed at said first end, a first conduit extending through said second end of said housing toward said first end, a second conduit communicating with the interior of said housing adjacent to said second end, said second conduit being disposed around and substantially coaxial with said first conduit, a coil concentric with said first conduit, said coil being spaced from and disposed within said second conduit, whereby maser material flowing through said unit passes through the interior of said first conduit and the annular space defined by said first and second conduits, said material being in the field of said coil both within said interior of said first conduit and in said annular space, and means for pumping said material through a path extending through said conduit and said annular space in a time less than the relaxation time of said material associated with the maser process in which said material is involved.

12. The combination defined in claim 11 including a magnet constructed to pass a magnetic field through said coil perpendicular to the axis thereof and means for imparting a spiral motion to said material as it flows past said coil, said pumping means and said spiral movement means imparting linear and rotational velocities to said material such that the molecules thereof encounter substantially the entire range of variation of said magnetic field in the region of said coil as they pass through said path.

References Cited in the file of this patent

UNITED STATES PATENTS

| | | |
|---|---|---|
| 2,721,970 | Levinthal | Oct. 25, 1955 |
| 2,911,587 | Bayly | Nov. 3, 1959 |
| 2,944,212 | Malling et al. | July 5, 1960 |

FOREIGN PATENTS

| | | |
|---|---|---|
| 789,238 | Great Britain | Jan. 15, 1958 |
| 1,180,455 | France | Dec. 29, 1958 |
| 814,098 | Great Britain | May 27, 1959 |

OTHER REFERENCES

Benoit: Academie des Sciences, Comptes Rendus, May 28, 1958, vol. 246, No. 21, pp. 3053 to 3055.

Allais: Academie des Sciences, Comptes Rendus, vol. 246, No. 14, Apr. 9, 1958, pp. 2123 to 2126.

Montchane et al.: Academie des Sciences, Comptes Rendus, vol. 246, No. 12, March 1958, pp. 1833 to 1835.

Mitchell et al.: British Journal of Applied Physics, vol. 7, No. 2, February 1956, pp. 67 to 72.

Carver et al.: Physical Review, vol. 102, No. 4, May 1956, pp. 975 to 980.

Proctor: Physical Review, vol. 79, No. 1, July 1950, pages 35 to 44.

Sherman: The Review of Scientific Instruments, vol. 30, No. 7, July 1959, pages 568 to 575 inclusive.